(No Model.) 2 Sheets—Sheet 1.

C. ESPLIN.
BAND SAW MILL.

No. 341,376. Patented May 4, 1886.

Witnesses
R. H. Sanford.
W. B. Kirtland.

Inventor
Charles Esplin,
By A. P. Paul
Atty.

(No Model.) 2 Sheets—Sheet 2.

C. ESPLIN.
BAND SAW MILL.

No. 341,376. Patented May 4, 1886.

Witnesses
R. H. Sanford
W. B. Kirtland

Inventor
Charles Esplin,
By U. C. Powel
Atty.

UNITED STATES PATENT OFFICE.

CHARLES ESPLIN, OF MINNEAPOLIS, MINNESOTA, ASSIGNOR OF ONE-HALF TO THE PRAY MANUFACTURING COMPANY, OF SAME PLACE.

BAND-SAW MILL.

SPECIFICATION forming part of Letters Patent No. 341,376, dated May 4, 1886.

Application filed January 21, 1886. Serial No. 189,253. (No model.)

*To all whom it may concern:*

Be it known that I, CHARLES ESPLIN, of Minneapolis, in the county of Hennepin and State of Minnesota, have invented certain Improvements in Upper Wheels for Band-Saws, of which the following is a specification.

This invention relates to improvements in band sawing-machines; and the object I have in view is to provide a machine of this class in which the saw is not strained or the slack of the saw is not carried forward by the momentum or overthrow of the upper wheel when the saw enters the cut, thus preventing the saw from making crooked or wavy lumber.

To this end my invention consists, generally, in a band sawing-machine whose upper wheel is provided with an independent band, upon which the saw is supported and within which the wheel turns freely.

The invention further consists in the construction and combination hereinafter described, and particularly pointed out in the claims.

Figure 1:
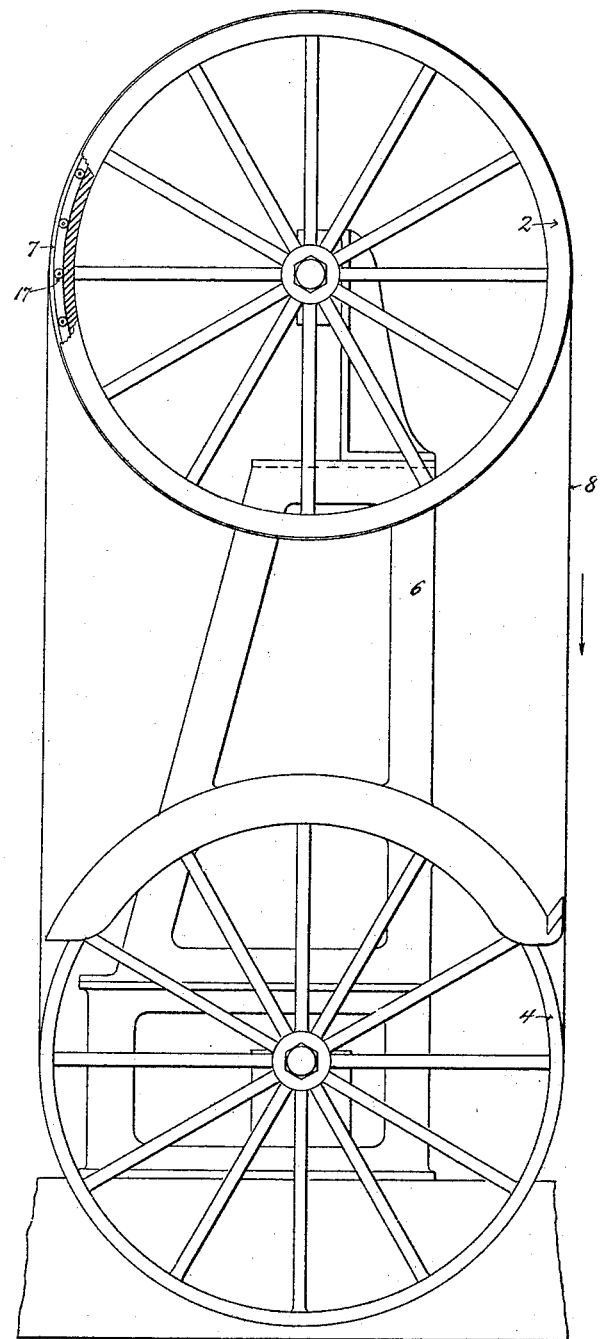
Figure 2:
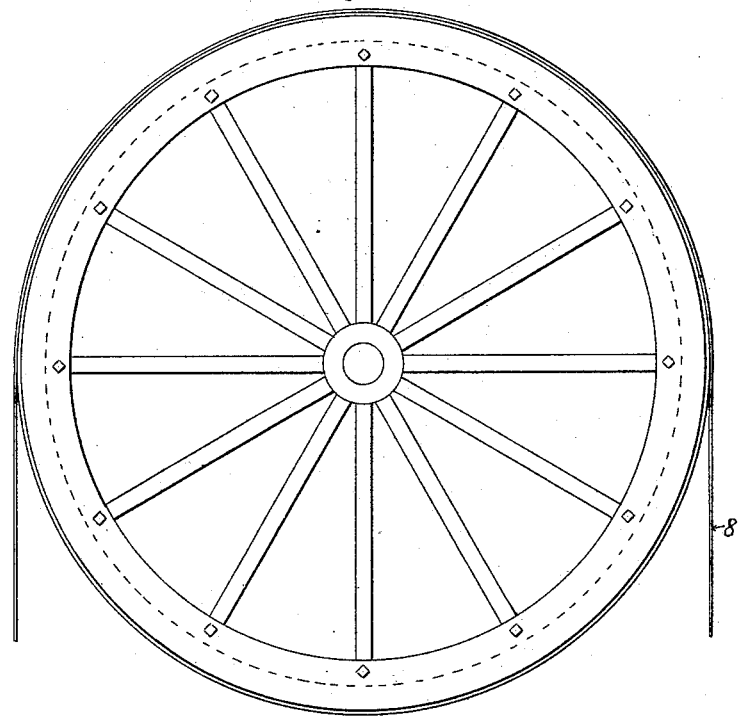
Figure 4:
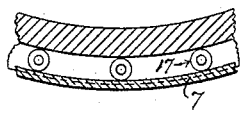
Figure 3:
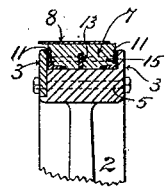
Figure 6:
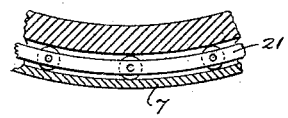
Figure 5:
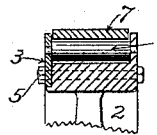
Figure 10:
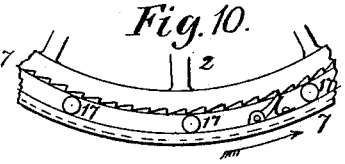
Figure 7:
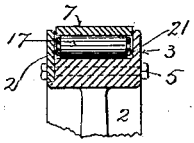
Figure 8:
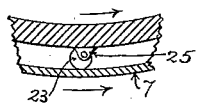
Figure 9:
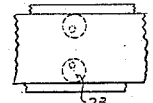

In the accompanying drawings, forming part of this specification, Figure 1 is a front elevation of a machine having my invention applied thereto. Fig. 2 is a front elevation of the upper wheel. Fig. 3 is a vertical section of the rim of the wheel shown in Fig. 2. Fig. 4 is a front elevation of a portion of a wheel, showing a modified construction. Fig. 5 is a section of the rim of the wheel shown in Fig. 4. Fig. 6 is a front elevation of a portion of a wheel, showing another construction. Fig. 7 is a section of the rim of the wheel shown in Fig. 6. Figs. 8 and 9 are details. Fig. 10 is a detail of a modification.

In machines of this class the saws are supported upon two wheels, one at the top or upper part of the machine, the other at the lower part. Power is applied for driving the saw to the lower wheel, the top wheel being an idler. The top wheel has not only to carry the saw, but it has to be made of sufficient strength to support the saw under the great strain to which it is subjected. The top wheel thus not only acts as an idler, but also as a powerful fly-wheel just when such an accumulation of momentum is fatal to the successful working of the machine. As the saw enters the cut it is stretched, and the additional strain upon it causes it to wrap more closely around the wheels on the tight side, causing some "slack," which the momentum of the heavy top wheel carries forward to the cutting side of the saw, which is the cause of the wavy or crooked lumber so much complained of by the users of band-saws. To obviate this difficulty, some makers have reduced the diameter of the top wheel and have brought the weight and strength of this wheel below the limit of safety, to insure the necessary strength and stiffness, while other makers have adopted different forms of tighteners to attain the same object; but all of these appliances are faulty, inasmuch as the demand upon them is instantaneous, while the appliances require considerable amount of time to act. To obviate these objections, which are common to all band-saws with which I am familiar, I provide the top wheel with a band or rim which is independent of the wheel itself, so that the wheel is free to rotate therein.

In the drawings, 2 represents the top wheel and 4 the lower wheel of a band sawing-machine. These wheels are mounted upon a suitable frame, 6, and they support the band-saw 8.

The top wheel may be of any suitable construction, and is provided with flanges 3, one of which is preferably secured to one side of its rim by bolts 5 or other suitable means. An independent band, 7, is placed within the grooves formed by the flanges 3. This band is free to turn upon the rim of the wheel, or the wheel is free to turn within the band. The saw passes over the band 7, and when the motion of the saw is arrested as it enters the cut the wheel itself is free to move forward by its momentum within the band.

The band 7, as shown in Fig. 3, is preferably composed of wood, and is provided with metallic corner angle-rings, 11, and a central ring, 13, which are secured together by suitable bolts or rivets, 15. These metallic rings protect the wood and prevent wear thereof.

I provide, as another construction of wheel, a series of rollers, 17, that are journaled in the flanges 3, and upon which the band 7 (which may in this instance be formed of metal covered with felt or other suitable material) is supported, as shown in Figs. 4 and 5. The rollers 17 may also be journaled in separate rings, 21, as shown in Figs. 6 and 7, which forms an anti-friction carrier between the band 7 and the rim of the wheel.

I do not confine myself to the construction of the band 7 as here shown, as any independent band of any suitable material within which the wheel can revolve under the conditions set forth may be used.

When the band-sawing machine is started, power is applied to the driving-wheel, and is transmitted to the upper wheel through the saw. In some cases it might happen that the band 7 would turn on the wheel, and that the wheel would not be started. I therefore provide means which prevents movement of the band over the wheel in one direction, while it does not prevent movement of the wheel within the band in the same direction. I have shown in Fig. 8 preferable means for securing this result. A roller, 23, is secured by eccentric journals in suitable flanges or projections on the rim of the wheel 2, and is arranged between the rim of the wheel and the band 7. It will be seen that the wheel can turn freely within the band in one direction, as indicated by the arrow, but that any movement of the band in the same direction causes the wheel to turn also. With this construction, when power is applied to drive the band-saw, the band 7 is moved in the direction of the arrow in Fig. 8, and the wheel with it. When the motion of the saw is arrested, the wheel may continue to rotate, turning freely within the band. Any equivalent device may be used with the wheel and band—such as a suitable ratchet mechanism, one form of which is shown in Fig. 10—to secure this result.

In Fig. 9 I have shown the eccentric wheels 2 3 pivoted to the band 7 and arranged to bear on the flanges 3 of the wheel. The operation of this device is substantially the same as that shown in Fig. 8. The wheel is free to move in the direction of the arrow without the band, but the band cannot move in the same direction without the wheel moving also. Without a device for this purpose there would be undue friction on the wearing parts by the carrying forward of the band by the saw without rotating the wheel itself.

I have described this invention as applied to the top wheel of a vertical machine; but it may be used also as the idler-wheel of a horizontal machine.

I claim as my invention—

1. The combination, with the band-saw wheel, of the independent band supported upon its rim, and a stop mechanism between said wheel and band, allowing said wheel to rotate in one direction within said band, but preventing movement of said band over said wheel in the same direction, as set forth.

2. The combination, with the band-saw wheel, of the independent band 7, supported on said wheel, and an eccentrically-journaled roller arranged between said band and said wheel, substantially as described.

3. The combination, with the band-saw wheel having the flanges 3, of the independent band 7, moving independently thereon, the metallic angle-rings 11, the metallic center ring, 13, and the bolts or rivets 15, securing said rings 11 and 13 to said band 7, all substantially as described.

4. The combination, with the band-saw wheel 2, of the independent band 7, supported upon the rim of said wheel, and the anti-friction rollers 17, arranged between said band and said rim, all substantially as described.

In testimony whereof I have hereunto set my hand this 7th day of January, 1886.

CHARLES ESPLIN.

In presence of—
JOSEPH GARBETT,
WARREN H. GETCHELL.